United States Patent [19]

Ha et al.

[11] Patent Number: 5,721,911
[45] Date of Patent: Feb. 24, 1998

[54] MECHANISM FOR METADATA FOR AN INFORMATION CATALOG SYSTEM

[75] Inventors: Khanh D. Ha, Milpitas; Jacques J. Labrie, Los Altos; David P. Salinero, San Jose, all of Calif.

[73] Assignee: International Business Machines Corporation, Armonk, N.Y.

[21] Appl. No.: 669,926

[22] Filed: Jun. 25, 1996

[51] Int. Cl.⁶ .................................................. G06F 17/30
[52] U.S. Cl. ........................ 395/611; 395/612; 395/613; 395/614
[58] Field of Search ........................ 395/611, 612, 395/613, 614, 616

[56] References Cited

U.S. PATENT DOCUMENTS

| | | | |
|---|---|---|---|
| 5,133,068 | 7/1992 | Crus et al. | 395/611 |
| 5,280,610 | 1/1994 | Travis, Jr. et al. | 395/614 |
| 5,315,709 | 5/1994 | Alston, Jr. et al. | 395/606 |
| 5,418,957 | 5/1995 | Narayan | 395/701 |
| 5,448,726 | 9/1995 | Cramsie et al. | 395/614 |
| 5,448,727 | 9/1995 | Annevelink | 395/612 |
| 5,519,855 | 5/1996 | Neenan et al. | 395/603 |
| 5,560,012 | 9/1996 | Ryu et al. | 395/701 |
| 5,572,650 | 11/1996 | Antis et al. | 395/356 |
| 5,586,311 | 12/1996 | Davies et al. | 395/601 |
| 5,596,746 | 1/1997 | Shen et al. | 395/612 |
| 5,644,764 | 7/1997 | Johnson et al. | 395/614 |

OTHER PUBLICATIONS

Leo Mark et al., "Metadata Management", *Computer*, Dec. 1986, pp. 26–36.

*Primary Examiner*—Paul V. Kulik
*Attorney, Agent, or Firm*—Randy W. Lacasse; David J. Kappos; Marilyn Smith Dawkins

[57] ABSTRACT

An extension of an information cataloging metadata model allows metadata users to link objects in a linear or peer-to-peer relationship (not hierarchical). Additional elements include adding a metadata functional category whoes object instances logically attach to other metadata objects in an information catalog (or information directory). Finally, the information cataloging metadata model is extended to enable metadata users to launch applications which can use values from any metadata object type as parameters to applications.

27 Claims, 2 Drawing Sheets

MECHANISM FOR METADATA FOR AN INFORMATION CATALOG SYSTEM

BACKGROUND OF THE INVENTION

Field of the Invention

The present invention relates generally to the manipulation of metadata by a user of such data. More specifically, the present invention allows user interaction with the metadata contained within an information cataloging system.

Metadata is data about data, for example, it is data that describes the name of a table, the location of a spreadsheet, etc., it is not the actual data located within the table or spreadsheet. Heretofore, the prior art has limited manipulation of metadata by a user. Typically, metadata has been given limited access by the user or the interface access proved to have had inherent limited usefulness. To be ultimately useful, the user must be able to link metadata in a non-hierarchical relationship (e.g. linear or peer-to-peer). In addition, a user should have the ability to provide feedback, in the form of metadata, to the system supervisor relating to measurable parameters, e.g. correctness of metadata, frequency of use, etc. In a final objective, program launching should be extended to other than the program object itself.

The present invention provides for the extension of an information cataloging metadata model which allows metadata users to link objects in a linear or peer-to-peer relationship (not hierarchical). The present invention additionally provides for the addition of a metadata functional category whose object instances logically attach to other metadata objects in an information catalog (or information directory). Thus "metadata about metadata" can be kept. Finally, it provides for the extension of the metadata model to enable metadata users the ability to launch applications which can use values from any metadata object type as parameters to applications.

The following definitions may be helpful in the complete understanding of the present invention:

- Metadata—data about data, for example, data which describes the name of a table, the location of a spreadsheet, etc., it is not the data located within the table or spreadsheet.
- Functional object groups—collection of functionally similar metadata types.
- Grouping—represents a collection of parental metadata, which may be considered source metadata.
- Elemental—represents a collection of subordinate data referred to as child metadata.
- Contact—represents a collection of metadata describing ownership information, i.e. who, what or location of responsible party of the actual data referred to by a metadata object. A "contact" between objects establishes ownership/responsibility of data.
- Dictionary—represents a collection of terminology used by the metadata/data.
- Support—represents a collection of metadata support information, e.g. news.
- Attachment—represents a collection of metadata logically connected to other metadata objects to provide an additional level of metadata.
- Contains—defining a hierarchical relationship.
- Handles—relationship enabling launch of a program based on another function group.
- Links—peer-to-peer or linear relationship.

SUMMARY OF THE INVENTION

Reference is made to application Ser. No. 08/134,355, entitled INFORMATION CATALOG SYSTEM WITH OBJECT-DEPENDENT FUNCTIONALITY, filed Oct. 8, 1993, abandoned in favor of application Ser. No. 08/658,402, filed Jun. 5, 1996, now allowed, and commonly assigned, which is hereby incorporated by reference. While its entire disclosure is not necessary for the complete understanding of the present invention, specific sections may be included herein to enhance understanding of elements and relationships previously established. A greater understanding of particular elements of the co-pending application or its operational environment may be obtained by referring to the complete specification contained therein.

The metadata model disclosed within the above cited co-pending application has been extended to allow the linking of Grouping and Elemental metadata objects. FIG. 1 illustrates the basic structure of the metadata model of the co-pending application. The model heretofore had six object categories: Grouping, Elemental, Contact, Dictionary, Support and Program.

The model has been extended, as shown in FIG. 2, to allow a link relationship to the Grouping and Elemental object type categories. The present invention provides for the extension of the metadata model which allows metadata users to link objects in a linear or peer-to-peer relationship (not hierarchical). One Grouping object can have a link relationship to many objects in the Grouping or Elemental categories. One Elemental object can have a link relationship to many objects in the Grouping or Elemental categories. Thus many-to-many relationships can be set up between Grouping and Elemental, Grouping and Grouping, and Elemental and Elemental. These relationships are set up by an administrator and affect the users view of links between objects. The function of this relationship allows for the display of objects and relationships by metadata users.

Further expansion of the metadata model of FIG. 1, includes the addition of Attachments. Attachments has been added as a seventh metadata functional category. Attachments allow any of the original six categories to have a relationship with an object in the attachment category. Objects in the attachments category can be created and related to objects in any of the six other categories by users (not just administrators) of metadata. This feature creates a feedback loop to administrators of the accuracy and use of the metadata. The function of this new category allows for the display of attachment objects from an object of any other category, creation of an attachment object to an object of any other category, moving the associations of an attachment object from one object to another, updating an attachment object, and deletion of an attachment object.

A final addition to the metadata model of FIG. 1 allows the launching of program objects against any object type in the metadata model except the program category. Many Program objects can have a relationship to one object type in any of the categories except for the Program category itself. Conversely, one Program object can be related to only one object type. The model is being extended to allow this type of relationship (program relationship) to more than just the Grouping and Elemental object type categories. Now Contact, Dictionary, Support and Attachment categories can have program relationships between an instance of a program object and an object type in one of these categories. These relationships are set up by an administrator and affect the users view of the launchable applications for each object type. The function of this extended relationship allows for the launch (invocation) of a program object from an object of any other category.

DESCRIPTION OF THE PREFERRED EMBODIMENTS

Figure 1:
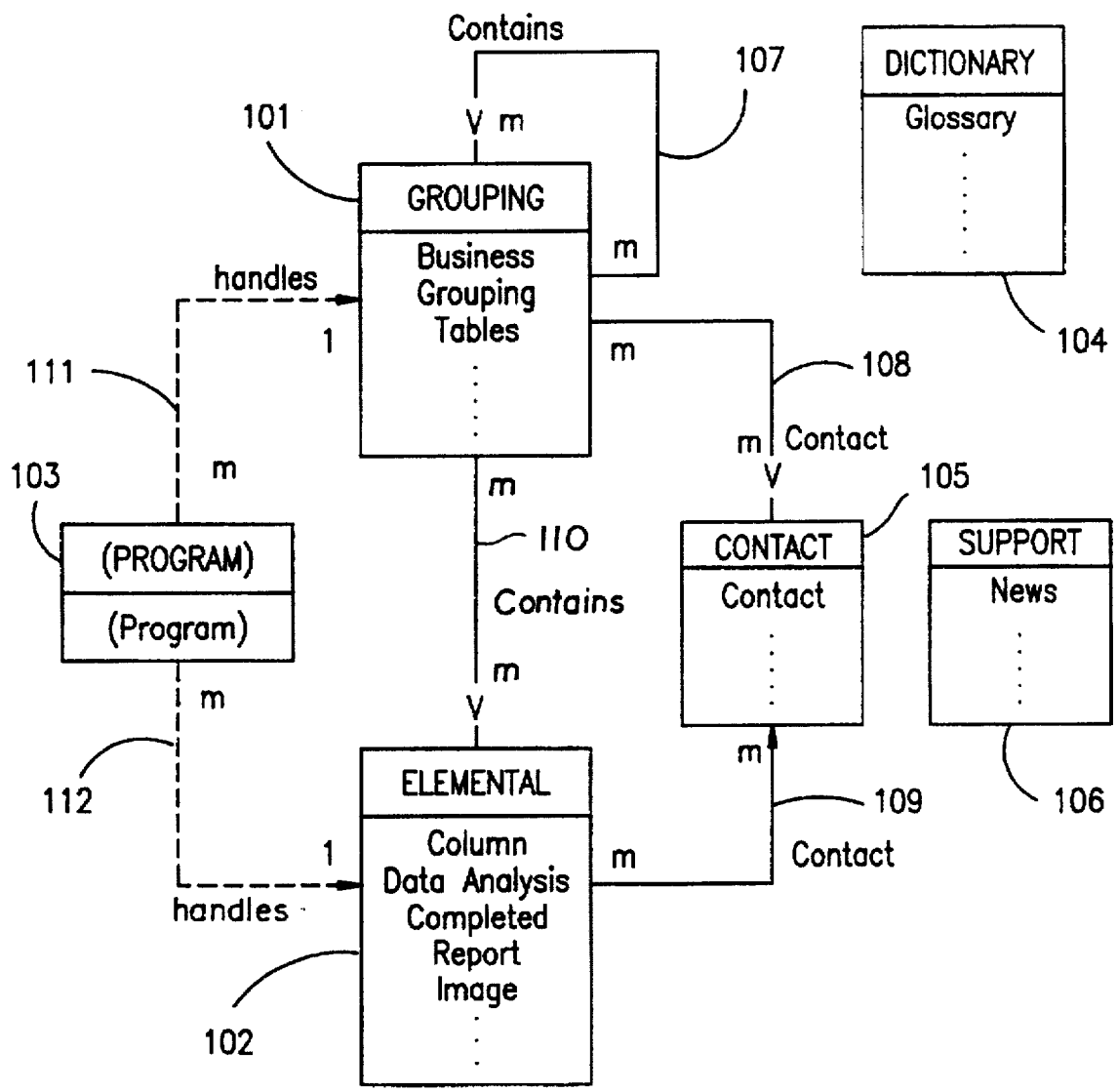
FIG. 1 illustrates a block diagram showing an information catalog metadata model which includes a set of function category classes as defined by a data processing system.

FIG. 1 illustrates the basic database information catalog metadata model structure of application Ser. No. 08/134, 355, filed Oct. 8, 1993, now abandoned in favor of application Ser. No. 08/658,402, filed Jun. 5, 1996, now allowed. The database catalog system allows knowledge workers to define meta information object types and object instances thereof corresponding to information managed by one or more data storage resources under the control of one or more data processing nodes. In large measure, the user-defined object types are customizable and extendable by knowledge workers or data processing administrators thereof. The users determine what information should be captured, what it is to be called, and how it is organized. The database catalog has no foreknowledge of the object types users will generate. However, the database catalog must support the user-generated object type with a defined set of database catalog functional services that are appropriate to the object types of generated by users.

To satisfy that objective, the database catalog system defines a plurality of functional categories within which the user-defined object types may be generated. Each functional category represents a categorization and/or subclassing of a super class of functional services provided by the database catalog. The functional categories to which the object types are assigned become part of the object type definition and limit the functions available to each object type. An object type is thus a data structure that may be thought of as a subclass object that encapsulates the functions inherited from the category class to which the object type belongs, together with one or more property attributes corresponding to information that the knowledge worker wishes to catalog. The object types can be populated with object instances that are generated by assigning values to the property attributes to create meta information objects that uniquely identifies units of information to be cataloged by the knowledge worker.

In the database catalog, the functional categories to which the object types may be assigned include, by way of example only, a "Grouping" category 101, an "Elemental" category 102, a "Program" category 103, a "Dictionary" category 104, a "Contact" category 105, and a "Support" category 106. All of the user-defined object types of the database catalog are placed in one of these six categories. Each category represents a distinct set of product functionality. The functional categories 101–106 may be further divided into two groups. A first group represented by categories 101, 102 and 103 contains "Information" objects corresponding to information from one or more data storage resources to be cataloged. A second group represented by categories 104, 105 and 106 contains "Support" objects corresponding to information that supports the cataloging of information defined by the Information objects. Examples of object types that may be assigned to the object categories 101–106 are illustrated in FIG. 1. These object types may be predefined within the database catalog and provided as an object type "starter set" for user convenience. It will be understood, however, that many other object types may be defined and users may well choose to delete the object type starter set in favor of a completely user-customized set of object types.

For purposes of discussion, however, a database catalog system is assumed to be populated with an object type starter set only, in which case the Grouping category 101 will be understood to contain a "Business Group" object type and a "Tables" object type. These object types represent information groupings containing information units or elements as members thereof. The purpose of the Business Group object type is to provide a generic container for organizing other grouping and elemental category object types such as tables, columns, queries, reports and images. The purpose of the Table object type is to describe the relevant properties of an SQL relational table or a client/server file.

In the example of FIG. 1, the Elemental category 102 contains "Column," "Data Analysis," "Completed Report" and "Image" object types. These object types are the individual members that could make up a Grouping object type. For example, the Column object type would complete the table definition established by a Table object type in which it is contained. The Data Analysis object type is used to represent an informational application to perform. The analysis could be in the form of a query, a chart, a report, a spreadsheet, or an SQL request. The Completed Report object type represents fully processed information that is ready for presentation to a knowledge worker. The purpose of the Image object type is to represent image information such as that contained in blueprints, maps, schematics and other graphical representations.

The Contact category 105 contains a "Contact" object type whose purpose is to identity persons that can provide support and assistance for one or more Grouping or Elemental object types. The Dictionary category 104 contains a "Glossary" object type whose purpose is to provide clarification of terms used by other object types. The Support category 106 contains a "News" object type whose purpose is to provide a mechanism for knowledge workers to advise other users of the current state of the database catalog. The Program category 103 contains a "Program" object type that defines application programs capable of processing particular Grouping or Elemental object types. Advantageously, as described in more detail below, various relationships can be defined between object instances from certain related function categories so cross-referencing information provided by the object instances.

Figure 2:
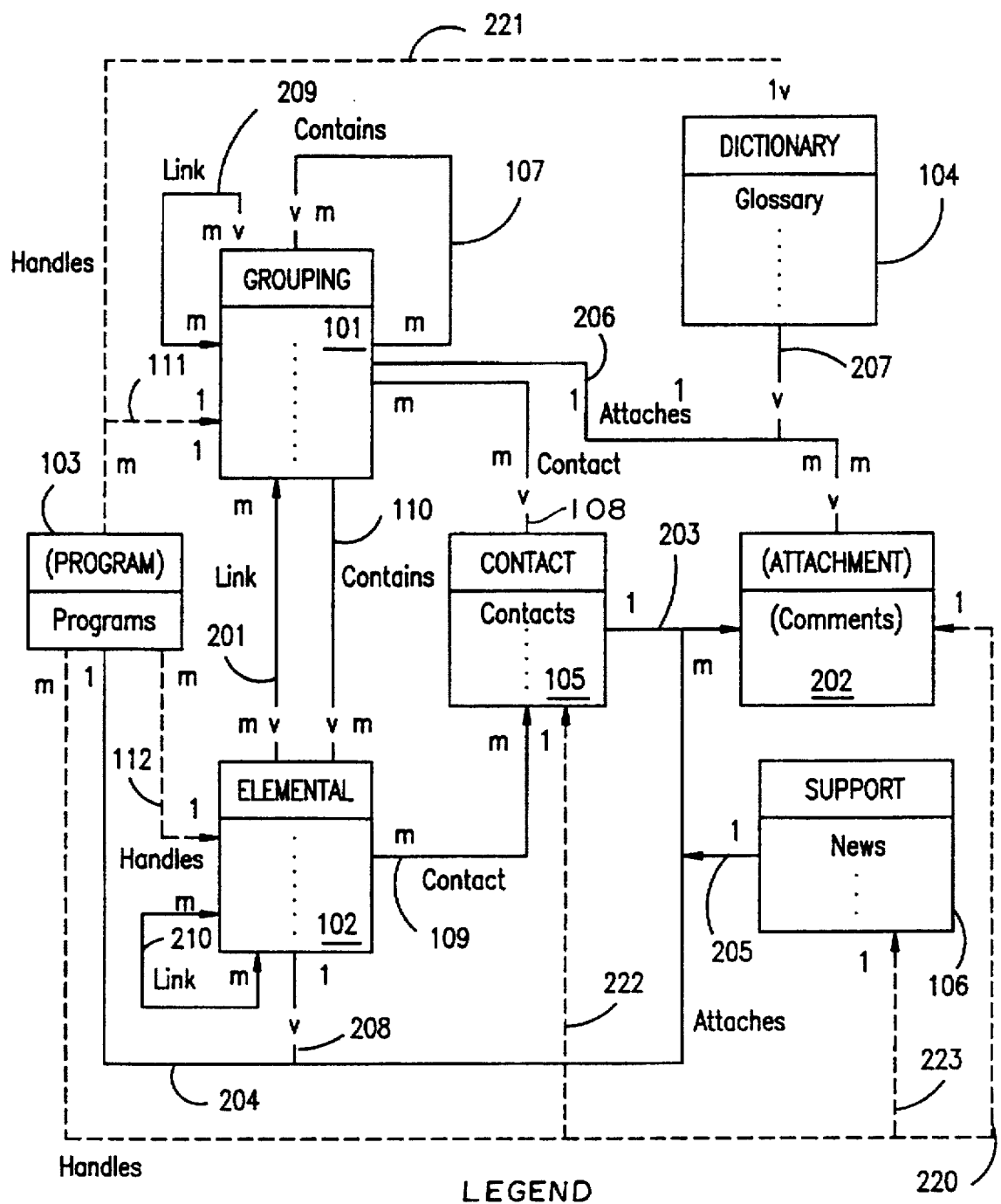
FIG. 2 illustrates the extension of the information catalog metadata model of FIG. 1.

FIG. 2 illustrates the present invention extension of the metadata model of FIG. 1 as shown and described further hereafter. A new programming relationship(link) has been added as shown by lines 201, 209 and 210. These lines, respectively, represent a peer-to-peer relationship between the Grouping and Elemental blocks, or between objects within the Grouping block or between objects within the Elemental block. Links are stored in a relational database in memory located within the computing system of the information catalog.

By creating a non-hierarchical relationship between objects, between or within these two categories, metadata objects can be linked which:

a. Are logically related, e.g., have the same key columns b. Are derived from the same source c. Have a foreign key relationship d. Provide a logical relationship between two objects with an intervening object to name the relationship.

An example of the above, a relational table may have a column named "Employee Identification Number" and another table may have a column named "Social Security Number". If this employer uses Social Security Numbers as the Employee Identification Number, then it makes sense to create a Link relationship between the metadata object which represents these two columns. This link can show there is a valid relationship between the actual data columns and these two columns may be "joined" to form a resultant set.

Another example would be two metadata table objects which are derived from the same source. Given a set of data, for example, a financial ledger system, two data tables could be derived from this information. Two metadata table objects could be used to describe both tables and their derivations. These metadata table objects could be linked together to show a peer-to-peer relationship (both derived from the same source).

FIG. 2 further illustrates the addition of the Attachments functional metadata category 202. Attachments are metadata which are logically attached to and further describe the metadata objects themselves or relationships thereto in an information catalog environment. As shown, connections 203, 204, 205, 206, 207 and 208 illustrate connections of the metadata objects located within the various six metadata functional categories.

Creating a functional category of metadata about metadata allows for users of metadata to:

a. Comment(feedback) on the accuracy of data or metadata from the user of the metadata to the administrator of the metadata.

b. Store metrics on use of data or metadata for decisions on what metadata to store.

c. Provide a mechanism for the tracking of corrections to metadata or data which can complete the feedback loop from the administrator to the metadata back to the user.

An example of Attachments, a user (Matthew) reviews the stored metadata (the object information model) and discovers something about the metadata object or the data itself which he would like to document. This discovery could be of many possibilities such as:

a. The metadata object points to the wrong data.

b. The data itself is not complete.

c. The data itself is not accurate.

d. He does some analysis and would like to share it with others who have access to the metadata.

e. He needs to communicate with the administrator of the metadata to have an update made or to provide him with access.

For example, Matthew, while browsing a "Grouping" object which represents a relational table may discover that the metadata object does not accurately reflect the table definition in the relational database. He may create an attachment object on the incorrect "Grouping" object which outlines the problem and communicates to the administrator of the metadata what change needs to be made. The attachment object itself could have status information as to whether the change is "open", "in progress", "closed", etc.

The metadata stored within the Attachments 202 can automatically keep track of some metrics on the use or currency of the metadata objects. For example, every time a user viewed a specific metadata object, an attachment object could be updated to reflect a new count on the number of users who viewed the object. Thus the frequency of access to an object could be kept. This information could be useful in determining which metadata objects to keep or discard.

A third extension of the metadata model of FIG. 1 is shown by lines 220, 221, 222 and 223 in FIG. 2. The relationships created enable launching of program metadata objects against any object type in the metadata model except the program category. Many Program objects can have a relationship to one object type in any of the categories except for the Program category itself. Conversely, one Program object can be related to only one object type. The model is being extended to allow this type of relationship (program relationship) to more than just the Grouping and Elemental object type categories. Now Contact, Dictionary, Support and Attachment categories can have program relationships between an instance of a program object and an object type in one of these categories. These relationships are set up by an administrator and affect the user's view of the launchable applications for each object type. The function of this extended relationship allows for the launch (invocation) of a program object from an object of any other category.

An example of the use of object program invocation, the metadata Dictionary objects 104 can be used to define terminology in the metadata stored throughout the information catalog system. Instead of defining the terminology directly, a pointer to another application can be stored for the Dictionary object and the user can launch the application to view the dictionary definition. For example, a user wishes the definition of the term "profit" which is used in a metadata object. He can search for a Dictionary metadata object for "profit" and instead of the definition being in the metadata object, he can launch an application such as "Kelvin's dictionary" (fictitious) to open a document at the place where "profit" is defined. This same concept can be used to provide detailed information about Contact, Support, or Attachment objects. That is, the metadata object is used as a pointer to information held outside of the metadata store.

The above information catalog and its individually described functional categories are implemented in the computing environment as disclosed in the co-pending application Ser. No. 08/134,355. For example, the present invention may be implemented on a conventional IBM PC or equivalent, multi-nodal system(e.g. LAN) or networking system. All programming, functional categories, metadata and data related thereto are stored in computer memory, static or dynamic, and may be retrieved by the user of the information catalog system in any of: conventional computer storage, display(i.e. crt) and/or hardcopy(i.e. printed) formats. The programming of the present invention may be implemented by one of skill in the art of relational database programming.

CONCLUSION

A system and method has been shown in the above embodiments for the effective implementation of an extended metadata model for an information catalog system. While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. In a computing system, a method for manipulation of metadata of an information catalog having a plurality of functional categories, each containing one or more of said metadata, said method comprising:

defining a first metadata functional category;

defining at least a second metadata functional category, said second functional category metadata retaining a hierarchical relationship with metadata located within said first metadata functional category;

locating related metadata objects within said categories;

linking said located metadata objects in a non-hierarchical relationship;

storing said linking information within said computing system, and wherein said linking of said metadata objects is performed between unique metadata located solely within said first metadata functional category, solely within said second metadata functional category or between metadata located within said first and second metadata functional categories.

2. A method for manipulation of metadata of an information catalog by a user as per claim 1, further comprising the step of establishing a second level of metadata which retains descriptive relationships of metadata located within any of said plurality of metadata functional categories.

3. A method for manipulation of metadata of an information catalog by a user as per claim 2, further comprising defining at least a third metadata functional category, said second level of metadata being retained therein.

4. A method for manipulation of metadata of an information catalog by a user as per claim 2, wherein said descriptive relationship represents a user perceived error with selected metadata.

5. A method for manipulation of metadata of an information catalog by a user as per claim 2, wherein said descriptive relationship represents a user perceived error with the data referred to by a selected metadata object.

6. A method for manipulation of metadata of an information catalog by a user as per claim 1, wherein said descriptive relationship tracks particular metrics of use of a selected metadata object.

7. A method for manipulation of metadata of an information catalog by a user as per claim 1, wherein said descriptive relationship tracks currency information of a selected metadata object.

8. A method for manipulation of metadata of an information catalog by a user as per claim 1, wherein said linking step includes logically linking one or more metadata objects in a peer-to-peer relationship.

9. A method for manipulation of metadata of an information catalog by a user as per claim 8, wherein said one or more metadata objects have similar key columns.

10. A method for manipulation of metadata of an information catalog by a user as per claim 8, wherein said one or more metadata objects are derived from the same source.

11. A method for manipulation of metadata of an information catalog by a user as per claim 8, wherein said one or more metadata objects have a foreign key relationship.

12. A method for manipulation of metadata of an information catalog by a user as per claim 8, wherein said one or more metadata objects comprise a logical relationship with an intervening object to name the relationship.

13. A method for manipulation of metadata of an information catalog by a user as per claim 2, wherein said plurality of metadata functional categories comprise at least a program category containing program objects and said method includes relating an instance of a program object to an object type located within any of the metadata functional categories enabling program launching from any metadata functional category selected from said group.

14. A method for manipulation of metadata of an information catalog by a user as per claim 2, wherein said functional categories comprise at least a program category and any objects located in a metadata functional category from the group including: contact, dictionary, support or attachments are enabled for program launching by relating the program category objects to the object types selected.

15. A method for manipulation of metadata of an information catalog by a user as per claim 13, wherein at least one of said functional categories comprises a metadata dictionary comprising launchable objects replacing dictionary definitions.

16. In a computing system, a method for manipulation of metadata of an information catalog having a plurality of metadata functional categories, each containing one or more of said metadata, said method comprising:

defining a first metadata functional category;

defining a second metadata functional category, said second functional category metadata retaining a hierarchical relationship with metadata located within said first metadata functional category;

defining a third metadata functional category retaining support metadata for the information catalog;

defining a fourth metadata functional category retaining definitions of terminology used within said information catalog;

defining a fifth metadata functional category retaining metadata of executable programs available to the information catalog;

defining a sixth metadata functional category retaining metadata reflecting ownership of data referred to by said metadata located within said functional categories, and defining a seventh metadata functional category retaining metadata reflecting information about the metadata located within the first six metadata categories.

17. A method for manipulation of metadata of an information catalog by a user as per claim 16, wherein said method further comprises the steps of:

locating related metadata objects within either of said first and second metadata functional categories;

linking said located metadata objects in a non-hierarchical relationship;

storing said linking information within said computing system, and wherein said linking of said metadata objects is performed between unique metadata located solely within said first metadata functional category, solely within said second metadata functional category or between metadata located within said first and second metadata functional categories.

18. A method for manipulation of metadata of an information catalog by a user as per claim 16, wherein said method further comprises the step of:

relating an instance of a program object, located within said fifth metadata functional category, to an object located within any of the metadata functional categories, except said fifth metadata functional category itself, enabling program launching from any metadata functional category selected from said group.

19. A method for manipulation of metadata of an information catalog by a user as per claim 16, wherein said seventh metadata functional category information represents a user perceived error with selected metadata.

20. A method for manipulation of metadata of an information catalog by a user as per claim 16, wherein said seventh metadata functional category information represents a user perceived error with the data referred to by a selected metadata object.

21. A method for manipulation of metadata of an information catalog by a user as per claim 16, wherein said seventh metadata functional category information tracks particular metrics of use of a selected metadata object.

22. A method for manipulation of metadata of an information catalog by a user as per claim 16, wherein said seventh metadata functional category information tracks currency information of a selected metadata object.

23. A method for manipulation of metadata of an information catalog by a user as per claim 17, wherein said linking step includes logically linking one or more metadata objects in a peer-to-peer relationship.

24. A method for manipulation of metadata of an information catalog by a user as per claim 17, wherein said one or more metadata objects have similar key columns.

25. A method for manipulation of metadata of an information catalog by a user as per claim 17, wherein said one or more metadata objects are derived from the same source.

26. A method for manipulation of metadata of an information catalog by a user as per claim 17, wherein said one or more metadata objects have a foreign key relationship.

27. A method for manipulation of metadata of an information catalog by a user as per claim 17, wherein said one or more metadata objects comprise a logical relationship with an intervening object to name the relationship.

* * * * *

UNITED STATES PATENT AND TRADEMARK OFFICE
CERTIFICATE OF CORRECTION

PATENT NO. : 5,721,911
DATED : February 24, 1998
INVENTOR(S) : Khanh D. Ha, et al.

It is certified that error appears in the above-identified patent and that said Letters Patent is hereby corrected as shown below:

Col. 1, line 33, after "Thus" insert --,--.

Col. 2, line 32, after "thus" insert --,--.

Col. 2, line 35, "users" should be "user's".

Col. 2, line 53, , after "Figure 1" insert --,--.

Col. 2, line 66, "users" should be "user's".

Col. 3, line 30, , after "types" delete "of".

Col. 6, line 56, after "rather," insert --it--.

Col. 6, line 58, after "invention" insert --,--.

Signed and Sealed this

Third Day of November, 1998

*Attest:*

*Attesting Officer*

BRUCE LEHMAN

*Commissioner of Patents and Trademarks*